H. MOOERS.
Car Axle.
No. 86,937.
Patented Feb. 16, 1869.
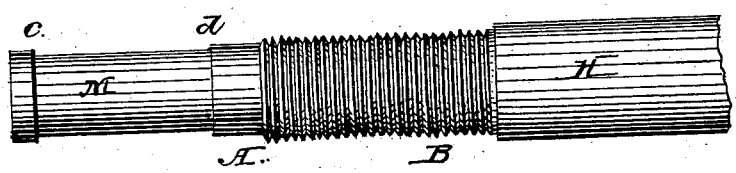
Witnesses
Inventor
Henry Mooers

United States Patent Office.

HENRY MOOERS, OF TOLEDO, OHIO.

Letters Patent No. 86,937, dated February 16, 1869.

IMPROVED CAR-AXLE.

The Schedule referred to in these Letters Patent and making part of the same.

*To all whom it may concern:*

Be it known that I, HENRY MOOERS, of Toledo, in the county of Lucas, and State of Ohio, have invented a new and useful Improvement in "Car-Axle-Trees;" and I do hereby declare that the following is a full, clear, and exact description, which will enable others skilled in the art to make and use my invention, reference being had to the annexed drawings, making a part of this specification, like letters referring to like parts.

The nature of my invention consists in turning a screw-thread upon the end of the axle that is to receive the wheel, in such a manner as to permit the wheel, when driven on, to bend over or flatten down the threads into the grooves between them, thus making the axle conform to the shape and size of the hole in the wheel, forming at the same time a sort of wedging surface all around, making it difficult for the wheel to get off, after once being put on, until worn out, the object being to increase the friction, and prevent the wheel working loose, and this, without subjecting it to that enormous strain, and not unfrequent breakage, which result from attempting to force it on to the smooth axle-tree as now manufactured.

In the drawing—

M H represents one end of an axle-tree for car-trucks and locomotive drive-wheels, and embodies my invention.

c d is the journal, upon which the axle-tree turns in its box; and the driving-wheel or truck-wheel, as the case may be, is driven on to the axle-tree until it strikes against the shoulder B, and covers the space from A to B.

The time consumed, and the trouble and vexation caused by the common mode of fitting car-wheels to their axles, on account of having to bore the hub of the wheel, and turn the axle with such uncompromising exactness as not to drive so slack as to work loose, nor so close as to burst the hub, and, more than all, the great percentage of wheels that are actually broken by this needless strain on the hub, are frightful in the extreme, when compared with the small amount of loss or accident that occurs where my improved mode is adopted of turning a screw-thread upon the axle, in such a manner as that the threads shall be a sufficient distance apart to allow, when the wheel is driven on, of their being each received into one of the grooves formed by the thread-cutter, their tops lying in the direction of the shoulder of the axle.

In fitting an axle-tree, then, into a car-wheel, after my improved plan, I have only to turn that portion of the axle-tree, that is to be inserted in the hub, a little larger than the bore in the hub. (A little practice on this point will readily afford a gauge for the amount larger which it is proper to turn it.) After this has been done, and before the axle-tree is removed from the lathe, I turn a screw-thread, as heretofore described and shown, from A to B, fig. 1, the cut being of sufficient depth to make the solid part of the axle small enough, so that, were it not for the threads, the wheel would drive on easily. This may be done by adjustment of the screw-cutter to the lathe. The threads being spaced, as heretofore stated, so as to make the cut or grooves sufficiently wide to receive them, when the wheel is driven on, the threads are forced over into the grooves, and, by their giving, prevent the breaking of the wheel, and at the same time form a sort of packing or regular series of small wedges, which tend to hold the wheel firmly in position upon the axle, as shown and described.

Having thus described my invention as fully as I deem it necessary,

What I claim as new, and of my invention, and for which I desire to secure Letters Patent, is—

The cutting of a screw-thread upon the shoulders of a car-axle, as shown in fig. 1, A B, substantially in the manner and for the purposes described.

HENRY MOOERS.

Witnesses:
W. W. COOKE,
H. F. JEWITT.